United States Patent [19]

Hogan et al.

[11] 4,221,591
[45] Sep. 9, 1980

[54] METHOD FOR RECLAIMING GALVANIZING QUALITY ZINC ALLOY FROM CONTINUOUS GALVANIZING LINE TOP DROSS

[75] Inventors: John C. Hogan, Greenhills; Alan F. Gibson, Middletown, both of Ohio

[73] Assignee: Armco Inc., Middletown, Ohio

[21] Appl. No.: 14,127

[22] Filed: Feb. 22, 1979

[51] Int. Cl.$^2$ .................. C22B 19/02; C22B 19/30
[52] U.S. Cl. ........................... 75/86; 75/10 R; 75/24; 266/227
[58] Field of Search ............... 266/24, 86, 10 R, 227; 427/433

[56] References Cited

U.S. PATENT DOCUMENTS

| | | | |
|---|---|---|---|
| 831,123 | 9/1906 | Wagner | 266/227 |
| 4,057,232 | 11/1977 | Ross et al. | 266/227 |

Primary Examiner—M. J. Andrews
Attorney, Agent, or Firm—Frost & Jacobs

[57] ABSTRACT

Means and a method for reclaiming galvanizing quality zinc alloy from the top dross of a continuous galvanizing line. A dross furnace is provided having front, rear and side walls and a hearth sloping from the rear wall toward the front wall. The front wall is provided with one or more tap holes or a full width slot so sized as to permit the passage of molten zinc alloy therethrough while retaining the resulting sponge or slag. The dross furnace is located with its front wall overhanging the coating pot of the continuous galvanizing line. The dross furnace is maintained at a temperature of from about 460° C. to about 850° C. and is charged with the top dross from the coating pot. The top dross has a residence time in the dross furnace of up to about two hours. The reclaimed galvanizing quality zinc alloy, at yields from about 50% to about 70% based upon the top dross treated, flows directly back into the coating pot. The resulting slag or sponge is removed from the dross furnace which is recharged with top dross.

2 Claims, 5 Drawing Figures

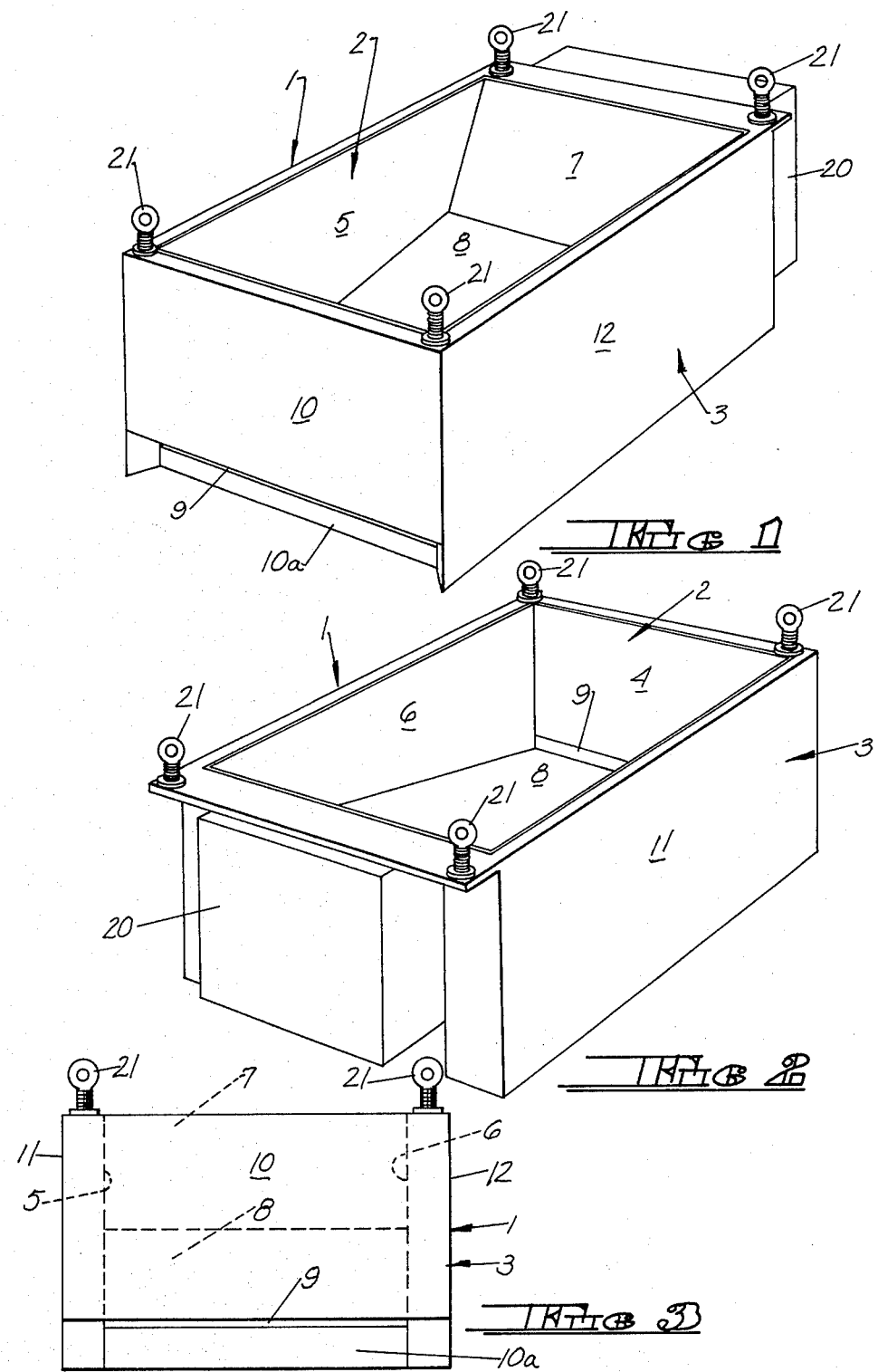

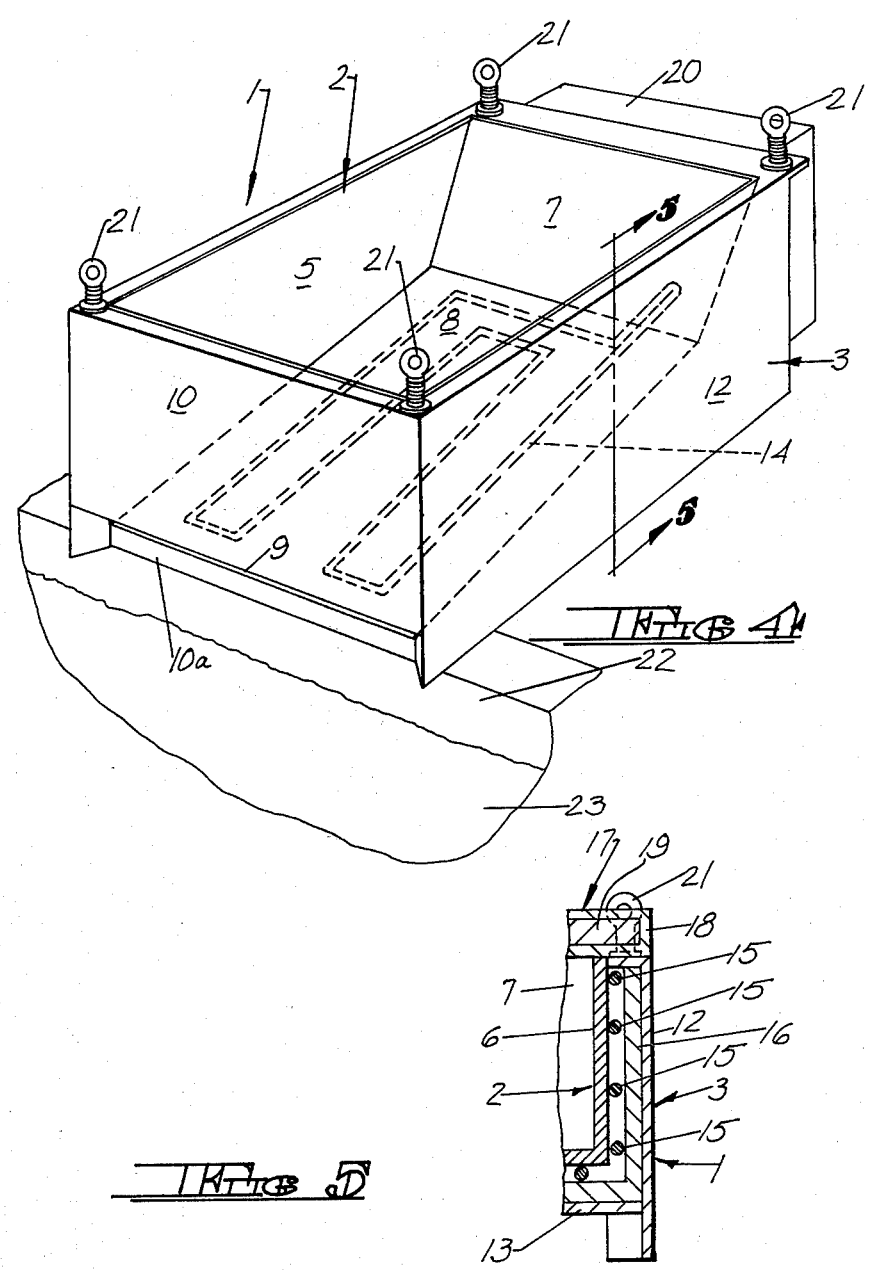

METHOD FOR RECLAIMING GALVANIZING QUALITY ZINC ALLOY FROM CONTINUOUS GALVANIZING LINE TOP DROSS

TECHNICAL FIELD

The invention relates to a means and method for reclaiming galvanizing quality zinc alloy from the top dross of a continuous galvanizing line, and more particularly to a top dross furnace and a continuous thermal process for reclaiming the galvanizing quality zinc alloy.

BACKGROUND ART

Continuous galvanizing line operations result in the production of considerable quantities of dross. Of the dross produced, some 80% to 90% is top dross or skimmings which float on the top surface of the bath of molten zinc alloy in the continuous galvanizing line coating pot. In such continuous galvanizing lines, several percent of the total zinc consumption may be lost to top dross. Although top dross can run from about 94% to about 99% total zinc, it is traditionally sold to zinc or zinc chemical producers at a considerably lower price than that paid for prime grade zinc. As a result, this represents a substantial economic loss to the galvanizer.

Chemical and metallographic examinations reveal the presence of three distinct phases in a typical sample of top dross. The top dross comprises a fibrous or sheet-like zinc oxide phase encapsulating large amounts of galvanizing zinc alloy in which an aluminum-iron-zinc alloy occurs as dispersed inclusions.

Prior art workers have made numerous attempts to recover zinc values from dross. Most of these attempts have been characterized by one or more drawbacks. Frequently prior art methods have been batch methods and have involved complex apparatus and difficult material handling problems including shaking, stirring, rotation or oscillation of the dross. Many prior art methods require a flux and/or tend to produce zinc fume, both of which present a pollution problem and/or a worker health problem.

U.S. Pat. No. 831,123 teaches a recovery apparatus comprising a fuel-fired brick furnace and a specially configured dross pan. The furnace is intended to bring the zinc values in the dross to the melting point whereupon they run out of the dross pan into a vessel by which they may be returned to the coating pot. U.S. Pat. No. 1,821,105 teaches apparatus for the collection of bottom dross by means of an endless chain of buckets. Zinc values are obtained through the use of a steam of air actuated cylinder to compress the dross through a perforated container. U.S. Pat. No. 2,433,615 utilizes a retort and a vaporization process to recover zinc from dross.

U.S. Pat. No. 2,463,468 again teaches a vaporization process wherein dross is melted under non-oxidizing conditions so as to evaporate zinc values therefrom. The zinc vapors are carried to a condenser and liquid zinc is recovered and cast into slabs. U.S. Pat. No. 2,481,591 relates to a method of treatment of aluminous dross. While an aluminum system is different from a zinc system, the reference is of interest as illustrating an exemplary dross recovery system utilizing a flux and rotation or oscillation of the treated dross. U.S. Pat. No. 2,701,194 sets forth a process for recovering zinc metal and its alloys from zinc dross utilizing a low melting point flux composition.

The process of removal of zinc values from slag taught in U.S. Pat. No. 2,795,500 includes the step of injecting a molten dross pool with a combustible mixture of liquid fluid and oxygen-containing gas. This reduces the reducible zinc compounds and the zinc is thereafter volatilized. Another vaporization system is set forth in U.S. Pat. No. 2,844,462. U.S. Pat. No. 3,198,505 is an example of a reference relating to a metal recovery apparatus for stirring dross in a drum. U.S. Pat. 4,003,559 sets forth apparatus for squeezing zinc from dross. Finally, U.S. 4,075,008 teaches the formation of a dross ingot placed on a permeable support and heated so as to melt zinc therefrom, the zinc being collected below the permeable support.

The method and means of the present invention contemplate the utilization of a continuous tapping, sloping hearth furnace which discharges the recovered zinc alloy directly into the coating pot. Both the apparatus and the process are simple, energy and cost efficient and involve reduced material handling. The process is free from zinc fuming, does not require the use of a flux and produces salable residue. No stirring, squeezing, shaking or the like is required.

DISCLOSURE OF THE INVENTION

The present invention is directed to means and a method for reclaiming galvanizing quality zinc alloy from the top dross of a continuous galvanizing line. The means comprises a dross furnace which may be of substantially rectangular configuration having front, rear and side walls. The dross furnace has a hearth which slopes downwardly from the rear wall toward the front wall. At the juncture of the hearth and the front wall, the front wall is provided with a narrow slot extending substantially the length of the front wall and being so sized as to permit the passage of molten zinc alloy therethrough, while retaining the resultant sponge or slag. As will be described hereinafter, various means may be used to heat the dross furnace in a controlled fashion so as to maintain its temperature between from about 460° C. to about 850° C. The dross furnace should be so sized as to adequately accommodate the dross produced in the coating pot with which it is to be used and so as to provide a residence time for the dross in the dross furnace of up to about two hours.

The dross furnace is located adjacent the melting pot with its front wall overhanging the melting pot so that molten zinc alloy from the dross within the dross furnace can exit the slot in the dross furnace directly into the melting pot. As indicated above, the dross furnace is maintained at a controlled temperature of from 460° to 850° C. and as dross accumulates in the melting pot, it is collected in a conventional manner and charged into the dross furnace. After a residence time within the furnace of up to about two hours, the remaining slag or sponge is removed from the dross furnace to make way for charges of untreated dross.

BRIEF DESCRIPTION OF THE DRAWINGS

FIG. 1 is a front and right side perspective view of the dross furnace of the present invention.

FIG. 2 is a rear and left side view of the dross furnace.

FIG. 3 is a front elevational view of the dross furnace.

FIG. 4 is a perspective view similar to FIG. 1 and illustrating the dross furnace located with its front wall overhanging the edges of a coating pot.

FIG. 5 is a fragmentary cross sectional view taken along section line 5—5 of FIG. 4 and fragmentarily illustrating a cover for the dross furnace.

DETAILED DESCRIPTION OF THE INVENTION

Attention is first directed to FIGS. 1 through 3 which illustrate the dross furnace of the present invention and wherein like parts have been given like index numerals. The dross furnace is generally indicated at 1 and is of substantially rectangular configuration. The furnace comprises an inner liner generally indicated at 2 and an outer shell, generally indicated at 3. The inner liner 2 may be made of any appropriate amterial compatible with the zinc bath. An excellent material from which to fabricate the inner liner is a steel having an analysis similar to that used in fabricating coating pots so as to minimize solution by the zinc. The inner liner comprises a front wall 4, side walls 5 and 6, and a rear wall 7. It will be noted that rear wall 7 slopes downwardly and toward front wall 4. The inner liner also comprises a hearth 8 which slopes downwardly from rear wall 7 toward front wall 4. The steel plates making up walls 4 through 7 and hearth 8 are welded together to form the inner liner 2. As is most clearly shown in FIGS. 2 and 3, at the juncture of hearth 8 and front wall 4, there is a slot 9 extending substantially the length of front wall 4 (i.e. the width of hearth 8). The slot 9 is of such height that it will permit the flow of molten zinc alloy from the furnace, but it will not permit the passage of the resultant slag or sponge therethrough.

The outer protective shell 3 of the furnace may be made of lighter gauge metal and comprises a front wall 10, side walls 11 and 12, a rear wall (not shown) and a bottom wall 13 (see FIG. 5) substantially paralleling hearth 8. As is most clearly shown in FIGS. 1 and 5, side wall 12 is of uniform height throughout its length. The same is true of outer liner side wall 11 (see FIG. 2) so that the furnace structure may be located on an appropriate supporting surface. It will also be noted that front wall 10 has a lower inset portion 10a exposing slot 9.

The dross furnace 1 can be heated in any appropriate manner including gas torch means, induction means or electrical resistance means, all of which are well known in the art.

Electrical resistance heating is the preferred method simply because it is easier to achieve accurate temperature control. To this end, resistance heating coils are provided between inner liner 2 and outer shell 3 adjacent the walls 4 through 7 and hearth 8 of inner liner 2. For purposes of clarity, only resistance coils adjacent hearth 8 are shown in broken lines in FIG. 4 at 14. Additional heating coils are shown at 15 in FIG. 5 adjacent inner liner wall 6. It will be understood that similar coils will be located adjacent the other inner liner walls 4, 5 and 7. Preferably the inner liner 2 and the resistance heating coils are surrounded by an appropriate insulative material 16 (see FIG. 5) such as mineral wool or the like to minimize heat loss through the outer liner 3.

While not necessary since under proper operation fuming does not occur, it is preferred to provide the dross furnace 1 with a lid to prevent excessive heat loss. The lid may take any appropriate form and is preferably insulated. In FIG. 5, a lid is generally indicated at 17, comprising a metallic envelope 18 surrounding a layer of insulative material 19. The lid 17 should be easily removable to permit charging and cleaning of the dross furnace 1. The lid 17 may, for example, be hingedly affixed to the dross furnace 1.

To complete the structure, the rearward end of the furnace may be provided with a housing 20 for the electrical connections to the resistance heating coils. The furnace may also be provided with lifting lugs 21 so that the furnace may readily be moved, if desired. It will be understood that the electrical resistance heating coils are controlled by an appropriate adjustable transformer (not shown), as is well known in the art.

In accordance with the method of the present invention, the dross pot 1 is located adjacent the coating pot of the continuous galvanizing line with its inner and outer front walls 4 and 10 and the slot 9 overlying the edge of the coating pot. This is illustrated in FIG. 4 wherein the edge 22 of a coating pot and bath 23 of zinc alloy within the coating pot are fragmentarily shown. The dross furnace is maintained at a temperature of from about 460° C. up to a temperature wherein zinc fume would begin to form. Preferably, the furnace is maintained at a temperature within the range of from about 570° C. to about 780° C. No zinc fuming has been observed at temperatures as high as 760° C. even with the furnace lid 17 open.

All of the top dross normally collected during galvanizing operation is transferred directly to the dross furnace in a molten state using standard dross ladles. The dross furnace 1 should be so sized as to be capable of accepting the top dross produced by the particular coating pot with which it is associated and to be capable of providing a residence time for the top dross within the dross furnace of up to about 2 hours. Periodically, a portion of the spongy slag resulting from this treatment is scooped out of the dross furnace 1, cast in dross pans and set aside for appropriate further processing or for sale to zinc or zinc chemical manufacturers. In the practice of this process, a zinc alloy recovery yield of from about 50% to about 70%, based upon the top dross treated, can be expected.

EXAMPLE

A furnace was constructed in accordance with the teachings of the present invention. The furnace inner liner 2 was formed of 9.5 mm steel plate. The hearth measured 510 mm by 380 mm. The depth of the furnace was 360 mm adjacent front wall 4 and 300 mm adjacent rear wall 7. The front wall 4 contained a 9.5 mm slot 9 running the width of hearth 8. The working volume of the furnace was approximately 230 kg.

The furnace was provided with electrical resistance elements rated at 13.5 kW (total). The resistance elements were attached to the exterior of the furnace liner 2 and were provided with an insulative layer of mineral wool. The exterior shell of the furnace was made of light gauge aluminized steel.

The dross furnace was used in a full scale mill test conducted at a 1.8 m wide horizontal continuous galvanizing line having a high intensity direct-fired preheater. Nominal operating production rate of galvanized product (0.58–3.2 mm thick) on this line was about 36 t/h, or roughly twice the rate for which the dross furnace was originally designed.

The mill test was conducted in the following manner. All of the top dross normally collected during galvanizing operations was transferred directly to the dross furnace in a molten state using standard dross ladles. The dross furnace temperature at the hearth was maintained and controlled at from 590° C. to 760° C. (primarily at 590° C.) by means of a variable transformer. The dross furnace was located at the front edge of the galvanizing pot such that all of the recovered zinc alloy product flowed directly back into the coating pot. Periodically, a portion of the spongy slag remaining in the dross furnace was scooped out of the furnace and cast into dross pans.

It was determined that fuming was not a problem up to at least 760° C., even when the dross furnace was operated without its lid. At temperature higher than about 760° C., the risk of the formation of zinc fumes is, of course, greater.

The mill test was conducted over a total of 20 shift turns spanning 9 days. The occasional interruptions encountered due to galvanizing line down time and the like did not affect continuous operation analysis.

During this mill test, it was found that from about 9 to about 12 dross pans of slag from the dross furnace were generated per turn as compared to from about 25 to about 30 pans of top dross normally collected in the absence of the practice of the present invention. The 9 to 12 pan value represents a maximum because the slag from the dross furnace could not be packed into the dross pans as densely as can normal top dross. These data indicate a zinc alloy recovery yield of from greater than about 50% to about 70% or more. Such a yield is considered to be excellent, particularly in view of the fact that the dross furnace was designed for a galvanizing line which generates only about half the top dross that the galvanizing line used in this mill test did.

Samples of top dross from the coating pot, slag from the dross furnace of the present invention and zinc alloy recovered from the dross furnace were taken during the mill test and were analyzed for zinc, iron, aluminum, lead and cadmium. The results are given in the table below.

ANALYSIS OF MILL TEST

| Sample No. | Sample Source | % Zn* | % Fe | % Al | % Pb | % Cd |
|---|---|---|---|---|---|---|
| 1 | Dross | 99.6 | 0.051 | 0.16 | 0.13 | 0.014 |
| 2 | Reclaimed Zn | 99.2 | 0.018 | 0.18 | 0.13 | 0.013 |
| 3 | Reclaimed Zn | 99.4 | 0.14 | 0.21 | 0.13 | 0.014 |
| 4 | Reclaimed Zn | 99.9 | 0.075 | 0.15 | 0.13 | 0.014 |
| 5 | Reclaimed Zn | 99.4 | 0.042 | 0.17 | 0.14 | 0.014 |
| 6 | Slag from Dross Furnace | 93.0 | 3.4 | 0.37 | 0.12 | 0.013 |
| 7 | Slag from Dross Furnace | 97.3 | 1.7 | 0.21 | 0.14 | 0.013 |

*±0.3% absolute

It can be seen that the composition of the recovered zinc alloy product is very close to that of typical galvanizing zinc alloy. The slag produced in the dross furnace is of such quality that it is readily salable to zinc and zinc chemical manufacturers.

The tests indicate that gravity separation of the zinc alloy phase of the dross was appreciable, with the yield of zinc alloy increasing with both time and temperature. The zinc oxide slag phase appears to agglomerate under the thermal treatment releasing the zinc alloy phase. It has been found that iron and oxygen tend to concentrate in the slag, as do the aluminum-iron-zinc alloy inclusions. It has further been found that the process does not affect lead and cadmium levels.

Modifications may be made in the invention without departing from the spirit of it. For example, it would be within the scope of the invention to provide the dross furnace with one or more tap holes at the juncture of front wall 4 and hearth 8, rather than the elongated slot 9. Each of the one or more tap holes should again be so sized as to permit the flow of molten zinc alloy therethrough, while retaining the slag or sponge within the dross furnace.

The zinc alloy yield can be somewhat increased by the addition of carbon to the dross furnace to reduce some of the zinc oxide. The carbon can be added in the form of graphite rod inserts, graphite powder, graphite bricks or a graphite lining for the dross furnace.

What we claim is:

1. A method of reclaiming galvanizing quality zinc alloy from the top dross of the coating pot of a continuous galvanizing line, said method comprising the steps of providing a dross furnace having front, rear and side walls and a hearth sloping downwardly from said rear wall toward said front wall, said front wall of said dross furnace at the juncture thereof with said hearth having at least one opening therein so sized as to permit the passage of molten zinc alloy from said dross furnace therethrough while retaining within the dross furnace any spongy slag formed therein, providing means to heat said dross furnace in a controlled fashion, locating said dross furnace at the edge of said galvanizing line coating pot with said front wall thereof and said at least one opening therein overhanging said coating pot, continuously charging said dross furnace with top dross from said coating pot, maintaining said dross furnace at a temperature of from about 460° C. to about 850° C., causing molten zinc alloy reclaimed from said top dross to flow through said at least one opening in said dross furnace front wall directly into said coating pot, providing a residence time for said top dross within said dross furnace of up to about two hours and periodically removing from said dross furnace spongy slag formed therein.

2. The method claimed in claim 1 including the step of maintaining said dross furnace at a temperature of from about 570° C. to about 780° C.

* * * * *